Patented Apr. 4, 1967

3,312,629
URANIUM DIOXIDE SOL PROCESS
Jean G. Smith, Baltimore, Md., assignor to W. R. Grace & Co., a corporation of Connecticut
No Drawing. Filed Aug. 19, 1964, Ser. No. 390,728
7 Claims. (Cl. 252—301.1)

This invention relates to uranium dioxide sols and is specifically directed to a process for producing stable aqueous sols which contain very reactive particles of uranium dioxide.

In summary, the process of this invention is a method for preparing a stable uranium dioxide aquasol comprising the steps of mixing an alkaline precipitated, substantially electrolyte-free uranium dioxide precipitate with water and with a member selected from the group consisting of water-soluble monovalent acids and uranous salts of monovalent acids in an amount sufficient to bring the pH of the mixture within the range of from 4.0 to 1.5, and heating the treated aqueous uranium dioxide suspension at a temperature within the range of from 80 to 120° C. until peptization occurs.

The preferred embodiment of this invention is a method for preparing a stable uranium dioxide sol comprising the steps of mixing an aqueous solution of a uranium salt of a monovalent acid such as hydrochloric acid with an alkaline material which can include ammonium hydroxide solution, a soluble metal hydroxide, and amines having a base constant, $K_b$, in excess of $1 \times 10^{-8}$ at 25° C., etc. to form a hydrous uranium dioxide precipitate; separating the precipitate from the solution and washing it substantially free of electrolytes, preferably by means of an alkaline solution such as a weak ammonia solution followed by a water wash; redispersing the washed precipitate in water to form a suspension having a solids concentration up to about 15 grams of $UO_2$ per 100 milliliters of suspension; treating the precipitate by mixing the suspension with a member selected from the group consisting of soluble monovalent acids and uranous salts of soluble monovalent acids in an amount sufficient to bring the pH of the dispersion within the range of from about 4.0 to 1.5 and preferably from about 3.5 to 2.5; and heating the treated uranium dioxide suspension at a temperature of about 80 to 120° C. until peptization occurs, preferably for about 1 hour at about 100° C. under reflux, whereby a stable, reactive uranium dioxide sol is produced.

Prior to the process of this invention, uranium dioxide sols had been prepared by various methods. Uranium dioxide aquasols had been prepared by precipitation of uranium dioxide sols from uranous salt solutions with a homogeneous precipitating agent, by autoclaving uranous salt solutions, and by removing anions from uranous salt solutions by dialysis. For example, Samsonow [Kolloid—Z.8, 96 (1911)] reported making a $UO_2$ sol by washing the precipitate obtained by electrolytic reduction of uranyl chloride. However, the sol formed was so unstable that it settled out within 24 hours. Similarly, the uranium dioxide sol produced by the other methods described above tend to settle out on standing.

The uranium dioxide sol of this invention has several nuclear applications. It can be used to form droplets which can then be dried in an immiscible solvent to form uranium dioxide microspheres. The microspheres are the source of an important nuclear fuel. The sols of this invention are also important in the fabrication of nuclear ceramics. They may be mixed with a powder, such as beryllia, to make a very intimate mixture. Because of the small size and high reactivity of the uranium dioxide sol particles, the mixtures will sinter at a lower temperature to form materials of higher density and greater strength than can be obtained with conventional $UO_2$ powders.

It is an object of this invention to provide a method for producing a highly reactive, stable uranium dioxide aquasol.

The uranium dioxide aquasol of this invention is obtained by peptizing freshly precipitated and washed hydrous uranium oxide. The uranous dioxide precipitate is obtained by mixing an alkaline reagent with a uranous salt solution. The uranous salt from which the aqueous solution is made is preferably the salt of a strong, monovalent acid such as hydrochloric acid. Salts of other acids such as acetic and formic acids, for example, can be employed. The uranous salt can be readily obtained from uranyl solutions by such means as electrolytic reduction or by reduction with sodium, zinc, uranium metal, hydrazine, hydrogen, etc. The alkaline precipitating agent can be an ammonium hydroxide solution, an alkali hydroxide such as hydroxide sodium or potassium hydroxide, an amine having a base constant, $K_b$, of greater than $1 \times 10^{-8}$ at 25° C., etc. Suitable amines include methyl amine, ethyl amine, and hydrazine, for example.

The uranous salt solution is mixed with an excess of an alkaline precipitating agent, and a hydrous uranium dioxide precipitate is formed. The uranium dioxide precipitate is then separated from the solution by centrifuging, for example, and is washed to remove free electrolyte. Preferably, the uranium dioxide is first washed with an alkaline solution such as a dilute ammonium hydroxide solution, and is then washed with water until the pH is less than 10.5.

The washed hydrous uranous dioxide is then redispersed in water in an amount sufficient to provide a concentration of up to about 15 grams of uranium dioxide per 100 milliliters of suspension. Drying of the precipitate prior to redispersion should be avoided. The redispersed precipitate is then peptized by adjusting the dispersion pH and by then heating to produce a stable sol. The reagent which is added to the suspension is preferably a strong, monovalent acid such as hydrochloric or nitric acid or the stable uranous salt of such an acid such as uranous chloride. Weak, monovalent acids such as acetic and formic acids can also be used, but peptization produced by weak acids is less complete. The quantity of acid employed is sufficient to provide a dispersion pH within the range of from about 4.0 to 1.5 and preferably from about 3.5 to 2.5. Undue lapse of time between formation of the precipitate and peptization should be avoided because peptization of aged precipitates is more difficult.

The acid-treated hydrous uranium dioxide suspension is then peptized by heating it with stirring at a temperature within the range of from about 80° to 120° C. for a period sufficient to produce peptization. The time required for peptization is largely dependent upon the temperature employed, lower temperatures requiring longer periods of heating. Heating times from about 5 minutes to 12 hours can be employed. Peptization is detected by routine techniques known in the industry. Simple settling tests can be employed, for example. Preferably, the acid treated suspension is heated for about 1 hour at about 100° C. under reflux. An inert gas atmosphere is maintained above the suspension to limit oxidation. Mechanical agitating devices such as ultrasonic generators or high speed shear mixers such as a "Waring Blender" can be used to complete peptization when chemical peptization is incomplete such as when a weak acid is employed as the peptizing agent.

The product uranium dioxide aquasol is jet black. However, the uranium dioxide may contain excess oxygen. The sol particles, upon analysis, have been found to have oxygen contents ranging from 2.0 up to 2.4 atoms of oxygen per atom of uranium, a uranium dioxide composition up to $UO_{2.4}$. This extra oxygen is contemplated within the meaning of the term uranium dioxide and is introduced from the reactions media, from imperfect oxygen exclusion from the system with inert gas blankets, and especially from the use of oxidizing acids such as nitric acid as the peptizing agent. A major portion of the excess oxygen is believed to be interstitial and is not detrimental in the product, being removed in later processing steps such as sintering operations, for example. Storage of the aquasol under a blanket of inert gas such as nitrogen to limit contact of the sol with oxygen is preferred, however.

The aquasol concentration can be increased to greater than 20 percent by weight of uranium dioxide by vacuum evaporation, preferably at temperatures below about 60° C. The solids concentration in the aquasol can also be increased by centrifuging and redispersing the solids in a lesser quantity of water.

The uranium dioxide aquasol will remain stable if maintained within the pH range of about 1 to 5, preferably at a pH of from about 2 to 4.5, and if the specific conductance is maintained within the range of about 0.1 to $1 \times 10^{-5}$ mho/cm. and preferably within the range of about $2 \times 10^{-2}$ to $5 \times 10^{-5}$ mho/cm. The relative kinematic viscosity of the sol will range from about 1 to 5.

The sol pH was measured with a Beckman Model G pH meter and the specific conductance was measured with an Industrial Instruments conductivity bridge, Model RC 16 B1.

The relative viscosity, $N_r$, of our sols was determined from sol density, $d_s$, and the drain time of equal volumes of the sol $t_s$ and of water $t_w$ from an Ostwald viscometer according to the following equation.

$$N_r = \frac{t_s}{t_w} d_s$$

This invention is further illustrated by the following specific, but non-limiting examples.

*Example 1*

A 378 ml. sample of uranous chloride solution obtained by electrolyte reduction of acidified uranyl chloride and containing 17.17 g. equivalent $UO_2$/100 ml. of solution was diluted to 1,073 ml. with water and was mixed with 358 ml. of a 5 N ammonia solution while being maintained under a nitrogen blanket. A uranous dioxide precipitate was formed. The resulting black precipitate was washed free of chloride ions with a 3 N ammonia solution and was then washed with water. The washed precipitate was then redispersed in water to a volume of 550 ml. of suspension. The pH of the suspension was adjusted to 3.96 with 7.4 ml. of 6 N hydrochloric acid. The acid treated suspension was then heated under a nitrogen blanket for 1 hour at 100° C. A stable black sol was recovered.

Electron microscopy showed the sol to consist of well-dispersed particles averaging from about 3 to 7 millimicrons in size. Other sol properties found were as follows:

pH _____ 1.9
Specific conductance, mho/cm. _____ $1.47 \times 10^{-2}$
Density, gm./cc. _____ 1.105
Concentration, wt. percent $UO_2$ _____ 10.6
Relative kinematic viscosity _____ 1.6

*Example 2*

The sol product of Example 1 was further concentrated by vacuum evaporation at 40° C. Properties after concentration were as follows:

pH _____ 1.9
Specific conductance, mho/cm. _____ $2.67 \times 10^{-2}$
Density, gm./cc. _____ 1.268
Concentration, wt. percent $UO_2$ _____ 22.6
Relative kinematic viscosity _____ 3.81

As one can see from the viscosity, the sol was still very fluid and could have been further evaporated, if desired. Electron micrographs showed no change in particle characteristics. In fact, particle dispersion was improved by the concentration.

*Example 3*

This example illustrates the use of nitric acid as the peptizing agent for the hydrous uranium dioxide precipitate.

A 530 ml. portion of a uranous chloride solution having a concentration equivalent to 12.60 g. $UO_2$/100 ml. was added to 800 ml. of 7.5 ammonia solution. This provided slightly more than a 100% stoichiometric excess of ammonia. The uranium dioxide precipitate formed was filtered, and the solids were first washed with 8 liters of a 3 N ammonia solution and then with 8 liters of deionized water.

The precipitate was then reslurried with sufficient deionized water to provide a final slurry volume of 1700 ml. The pH of the slurry was adjusted to 2.4 with 3.7 ml. of 5.3 N nitric acid, and the treated slurry was heated to the boiling point under a nitrogen blanket and refluxed for 1 hour.

Particle dispersion of the product was excellent. The black sol was stable. Other sol properties were as follows:

pH _____ 1.59
Special conductance, mho/cm. _____ $1.38 \times 10^{-2}$
Density, gm./cc. _____ 1.104
Concentration, wt. percent $UO_2$ _____ 10.25

*Example 4*

In this example, the procedure followed in forming the redispersed uranium dioxide suspension in this example was identical to that described in Example 3. However, less nitric acid was added to the suspension. The quantity of nitric acid added was sufficient to adjust the suspension pH to 3.4. The treated suspension was refluxed for 1 hour.

The product formed was a stable, black sol having the following properties:

pH _____ 1.52
Specific conductance, mho/cm. _____ $1.54 \times 10^{-2}$
Density, gm./cc. _____ 1.106
Concentration, wt. percent $UO_2$ _____ 10.43

Obviously, many modifications and variations of the inventions, as herein above set forth, may be made without departing from the essence and scope thereof, and only such limitations should be applied as are indicated in the appended claims.

I claim:
1. A process for preparing a stable uranium dioxide aquasol comprising the steps of:
(a) mixing alkaline-precipitated, hydrous uranium dioxide with water and with a member selected from the group consisting of water-soluble acids having monovalent anions, uranous salts of water-soluble acids having monovalent anions, and mixtures thereof, in an amount sufficient to bring the pH of the mixture within the range of from about 4.0 to 1.5, and
(b) heating the aqueous uranium dioxide suspension at a temperature within the range of from about 80° to 120° C. until peptization occurs.

2. The process of claim 1 wherein the heating is continued for a period of from about 5 minutes to 12 hours.

3. The process of claim 1 wherein the peptized, stable sol is concentrated by evaporation under vacuum at a temperature below 60° C.

4. A process for preparing a stable uranium dioxide sol comprising the steps of:
(a) mixing an aqueous solution of a uranous salt of an acid having monovalent anions with a water-soluble alkaline reagent selected from the group consisting of ammonium hydroxide, water-soluble metal hydroxides, and amines having a base constant, $K_b$, of greater than $1 \times 10^{-8}$ at 25° C. to form a uranium dioxide precipitate, (b) separating the precipitate from the solution and washing it, (c) redispersing the washed precipitate in water to a concentration of up to about 15 grams of uranium dioxide per 100 ml. of suspension and treating the precipitate by mixing the suspension with a member selected from the group consisting of soluble acids having monovalent anions, uranous salts of soluble acids having monovalent anions, and mixtures thereof, in an amount sufficient to bring the pH of the mixture within the range of from about 4.0 to 1.5, and (d) heating the treated uranium dioxide suspension at a temperature of from about 80° to 120° C. until peptization occurs.

5. The process of claim 4 wherein the redispersed uranium dioxide suspension is adjusted to a pH within the range of from about 3.5 to 2.5.

6. The process of claim 4 wherein the treated uranium dioxide suspension is heated for a period of from 5 minutes to 12 hours.

7. The process of claim 4 wherein the treated uranium dioxide suspension is heated for 1 hour at a temperature of about 100° C. under reflux in an inert atmosphere.

References Cited by the Examiner

UNITED STATES PATENTS

| | | | |
|---|---|---|---|
| 2,798,049 | 7/1957 | White et al. | 252—301.1 |
| 3,024,199 | 3/1962 | Pasfield | 252—301.1 |

CARL D. QUARFORTH, *Primary Examiner.*

BENJAMIN R. PADGETT, *Examiner.*

S. J. LECHERT, JR., *Assistant Examiner.*